US007920190B2

(12) United States Patent
Moholt et al.

(10) Patent No.: US 7,920,190 B2
(45) Date of Patent: Apr. 5, 2011

(54) METHOD AND APPARATUS PROVIDING COLUMN PARALLEL ARCHITECTURE FOR IMAGERS

(75) Inventors: Jorgen Moholt, Oslo (NO); Tore Martinussen, Oslo (NO)

(73) Assignee: Aptina Imaging Corporation, George Town (KY)

( * ) Notice: Subject to any disclaimer, the term of this patent is extended or adjusted under 35 U.S.C. 154(b) by 670 days.

(21) Appl. No.: 11/907,374

(22) Filed: Oct. 11, 2007

(65) Prior Publication Data

US 2009/0096904 A1  Apr. 16, 2009

(51) Int. Cl.
*H04N 3/14* (2006.01)
*H04N 5/335* (2006.01)
(52) U.S. Cl. .......................... 348/294; 348/302; 348/304
(58) Field of Classification Search ........... 348/294–324
See application file for complete search history.

(56) References Cited

U.S. PATENT DOCUMENTS

| 6,137,432 | A | 10/2000 | Xiao | |
|---|---|---|---|---|
| 6,452,149 | B1 * | 9/2002 | Yamashita et al. | 250/208.1 |
| 6,545,624 | B2 | 4/2003 | Lee et al. | |
| 6,757,018 | B1 | 6/2004 | Fowler | |
| 6,885,396 | B1 | 4/2005 | Panicacci et al. | |
| 6,943,838 | B2 * | 9/2005 | Fossum et al. | 348/311 |
| 6,984,816 | B2 * | 1/2006 | Holm et al. | 250/214 R |
| 7,068,319 | B2 * | 6/2006 | Barna et al. | 348/372 |
| 7,565,033 | B2 * | 7/2009 | Hanson et al. | 382/304 |
| 7,623,173 | B2 * | 11/2009 | Nitta et al. | 348/302 |
| 2004/0041931 | A1 * | 3/2004 | Tu et al. | 348/300 |
| 2005/0134714 | A1 * | 6/2005 | Carlson et al. | 348/302 |
| 2005/0195304 | A1 * | 9/2005 | Nitta et al. | 348/308 |
| 2005/0195645 | A1 | 9/2005 | Panicacci et al. | |
| 2005/0253942 | A1 * | 11/2005 | Muramatsu et al. | 348/273 |
| 2006/0119903 | A1 | 6/2006 | Chiba et al. | |

FOREIGN PATENT DOCUMENTS

JP  2003259234 A  9/2003

OTHER PUBLICATIONS

Forchheimer R et al., "Single-Chip Image SEnsors With a Digital Processor Array", Apr. 1, 1993, Journal of VLSI Signal Processing, vol. 5 No. 2/03, pp. 121-131.*
International Search Report and Written Opinion dated Dec. 19, 2008 issued in Application No. PCT/US2008/078910.
Tabet, Muahel et al., "CMOS image sensor camera with focal plane edge detection," Electrial and Computer Engineering, vol. 2, pp. 1129-1133, May 13, 2001.
Kleinfelder, Stuart et al., "A 10000 frames/s CMOS digital pixel sensor," IEEE Journal of Solid-State Circuits, vol. 36, No. 12, pp. 2049-2059, Dec. 2001.
Forchheimer, Robert, "Single-chip image sensors with a digital processor array," Journal of VLSI Signal Processing, vol. 5, Nos. 2/3, pp. 121-131, Apr. 1993.
El Gamal, Abbas et al., "CMOS image sensors," IEEE Circuits & Devices Magazine, vol. 21, No. 3, pp. 6-20, May 2005.
Burns, J. et al., "Three-dimensional integrated circuits for low-power, high-bandwidth systems on a chip," IEEE International Solid-State Circuits Conference, pp. 268-269, p. 453, Feb. 2001.

(Continued)

*Primary Examiner* — Jason Chan
*Assistant Examiner* — Pritham Prabhakher

(57) ABSTRACT

An imaging apparatus and a method using column processing circuits arranged in multiple rows for processing pixels in a pixel array.

2 Claims, 13 Drawing Sheets

OTHER PUBLICATIONS

Mendis, Sunetra K. et al., "CMOS active pixel image sensors for highly integrated imaging systems," IEEE Journal of Solid-State Circuits, vol. 32, No. 2, pp. 187-197, Feb. 1997.

H. Yamashita and H. Sodini; A 128x128 CMOS imager with 4x128 bit-serial column-parallel PE array; Solid-State Circuits Conference, 2001, Digest of Technical Papers; 2001; pp. 96-97, 436; !SSCC, IEEE International; ISBN 0-7803-6608-5; San Francisco, California, U.S.A.

Abbas El Gamal, David Yang, and Boyd Fowler Information Systems Laboratory, Stanford University; Pixel Level Processing—Why, What, and How?; IS&T/SPIE Conference on Sensors, Cameras, and Applications for Digital Photography, San Jose, California; Jan. 1999; pp. 1-3; SPIE vol. 3650; No. 0277-786X/99; Information Systems Laboratory, Stanford University, Stanford, California, U.S.A.

Apr. 22, 2010 International Preliminary Report on Patentability and Written Opinion (7 pages).

* cited by examiner

METHOD AND APPARATUS PROVIDING COLUMN PARALLEL ARCHITECTURE FOR IMAGERS

FIELD OF INVENTION

Embodiments relate generally to an imager having a column-parallel architecture.

BACKGROUND OF THE INVENTION

FIG. 1 is a block diagram of a conventional solid state imager 100, e.g. a CMOS imager. The imager 100 includes a plurality of pixels 102 for sensing a level of incident light. The pixels 102 are arranged into rows and columns to form a pixel array 101. Typically, each pixel 102 produces a reset signal Vrst and a photo signal Vsig onto a respective column line, which are sampled and held and then subtracted to remove common noise and provide an indication of the level of incident light seen by the pixel.

The imager 100 also includes a timing and control circuit 150 for controlling image acquisition and readout of the pixel array 101. The timing and control circuit 150 operates a row decoder 120, row driver 110, column decoder 170, a column memory 165, and a column parallel analog-to-digital converter 160. The row decoder 120 and row driver 110 are operated to select a row and supply operating signals to the selected row within the pixel array 101. The selected row is readout by the column parallel analog-to-digital converter 160, which has associated analog circuits for sampling and holding the Vrst and Vsig signals, and circuits for subtracting and amplifying the signals prior to amplification. These analog circuits receive signals from the pixels in the selected row via column readout lines. For each pixel 102 in the selected row, the analog circuits associated with analog-to-digital converter 160 subtracts the signals to form an analog pixel signal (either Vrst-Vsig or Vsig-Vrst). Also, the associated analog circuit may further amplify the signal or subject it to other form of analog processing. Finally, the column parallel analog-to-digital converter 160 converts the analog signal into digital form, which it stores in a column memory 165. The column memory 165 supplies the digital pixel values for a row of pixels in sequence to the image processor 180. Though not shown in FIG. 1, the digital signals may also bypass column memory 165 and be supplied directly to the image processor 180 from the column parallel analog-to-digital converter 160. The image processor 180 may perform additional processing operations on the digital signals such as, for example, color correction, demosaicing, defect correction, and others, before providing an image output. The output of the image processor 180 is routed to an output circuit 190, which can output the processed result to a storage device, screen, or printer.

Existing circuits for processing and digitizing the analog signals are relatively complex, particularly the analog-to-digital converter, making designs using existing circuits difficult to economically scale for large pixel arrays. Additionally, while pixel size continues to shrink, the associated analog-to-digital converters do not shrink at the same rate. The inherent minimum spacing required between analog-to-digital converters remains the same and becomes significant relative to pixel column width. The analog-to-digital converter layout becomes more complicated with increases in pixel array density and may lead to inefficient use of the design space. As analog-to-digital converters are made narrower to scale with shrinking pixel sizes, each converter's aspect ratio (the ratio of height to width) increases. This results in increased difficulties when laying out a circuit design. Accordingly, there is a need for a more space-efficient design for the converting of analog pixel signals to digital signals in solid-state imagers employing parallel columns for pixel signal readout.

DETAILED DESCRIPTION OF THE INVENTION

Figure 1:
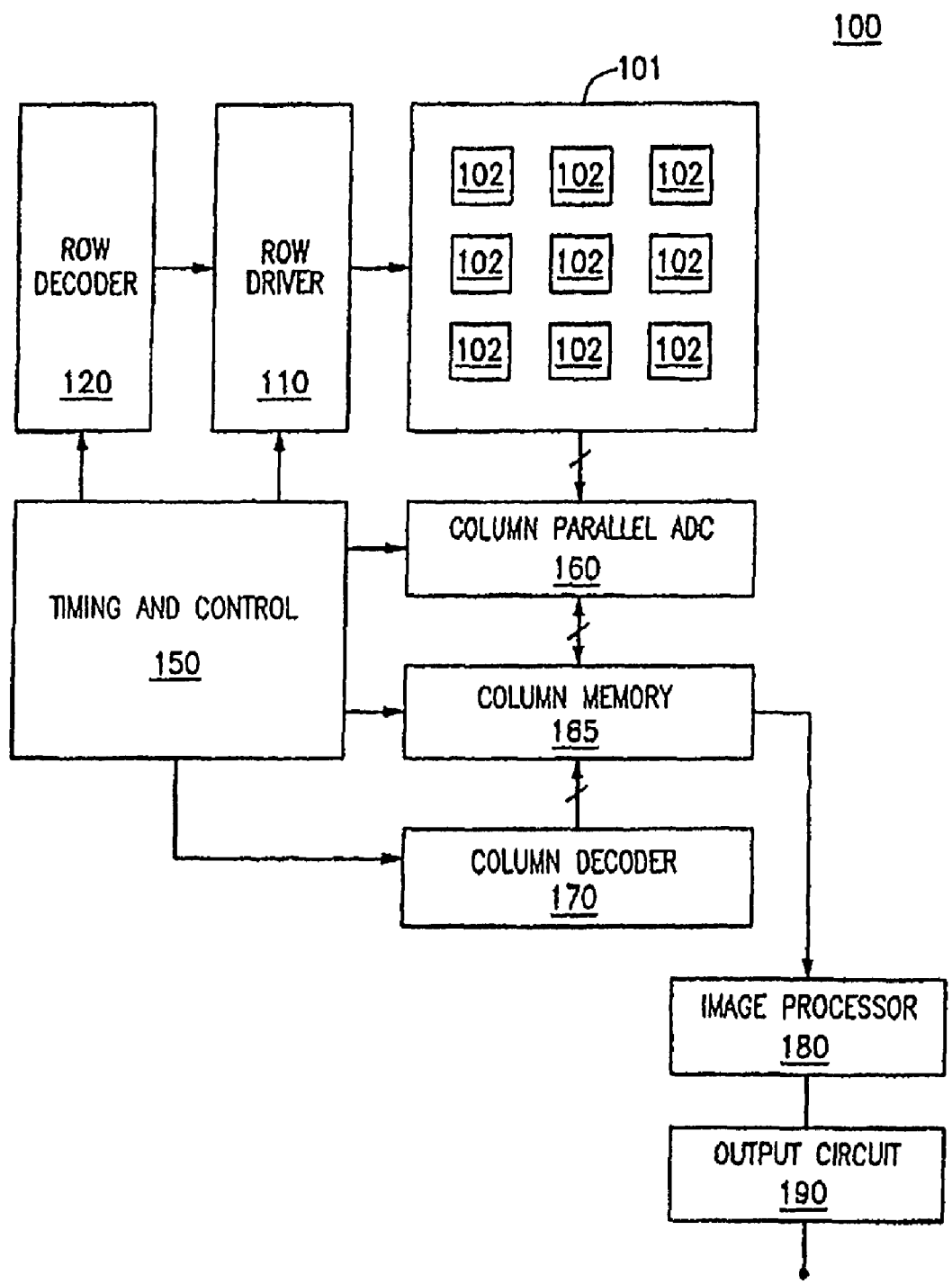
FIG. 1 is a block diagram of a conventional solid state imager.

In some solid state imagers using parallel columns for array readout, such as CMOS imagers, a row of pixels is read out column-by-column in series. That is, each pixel has a reset signal Vrst and a photo signal Vsig, which are sampled and stored in a sampling component, subtracted (e.g., Vrst-Vsig), and processed by a single analog-to-digital converter to produce digital representations of the image data. Because a single analog-to-digital converter is used for all pixel signals in a row and for all rows in the pixel array 101, there is a delay in processing the entire array. In more recent imager designs, this problem is mitigated by providing multiple analog signal circuits and associated analog-to-digital converters, with each handling a smaller set of array columns to which selected row pixels are connected. In some designs, there may be an analog signal processing circuit and associated analog-to-digital converter for each column. This approach is illustrated in FIG. 1.

Column parallel architectures allow more efficient readout of a pixel array, as multiple columns of pixels may be read out and digitized simultaneously. Optimally, there is an sample and hold circuit, differential amplifier circuit, gain amplifier circuit, and analog-to-digital converter for each column in the pixel array, allowing an entire row of pixels to be sampled and digitally converted simultaneously in each row readout cycle. This requires at least a row of each of these circuits on the top or bottom of the pixel array, each circuit connected to a column of pixels within the array. Alternatively, there may be a row of analog-to-digital converters and readout circuits at the top of the array and another row of analog-to-digital converters and readout circuits at the bottom of the array, with each reading out pixels coupled to an array column. Some designs include a row of analog-to-digital converters and readout circuits at both the top and bottom of the pixel array, and the readout of the columns of the array alternates between top and bottom readout circuits. In some designs, there may be an analog signal processing circuit for each column which share a more limited number of analog-to-digital converters.

Because analog-to-digital converters and associated analog sampling circuits and amplifiers include a number of circuit devices, such as capacitors, there is a certain minimum distance that must be maintained between components when they are placed on an integrated circuit. Because the analog-to-digital converter is often the most complicated circuit and takes up the largest area on the die, usually this certain distance is the distance which must be maintained between adjacent analog-to-digital converters. The design of column circuitry and column analog-to-digital converters is affected by this distance, because they are confined to the width of one or two pixels. As pixel pitch, which is the average width of the pixels, decreases to increase the pixel density, the width of the columns of the pixel array become narrower. As the distance required between components is constant, that distance becomes significant relative to the decreasing column width. In turn, the aspect ratio (the ratio of a component's height to its width) of the some components, such as analog-to-digital converters, increases. As the aspect ratio increases, a larger percentage of the die area, especially in the area between components for adjacent columns, may not be used. Additionally, the manufacturing of some components becomes more complicated as their aspect ratio increases, leading to an increase in manufacturing errors. Due to these constraints, there is a lower limit to the width of some components, such as analog-to-digital converters, and thus to column width under circuit design rules.

Figure 2B:
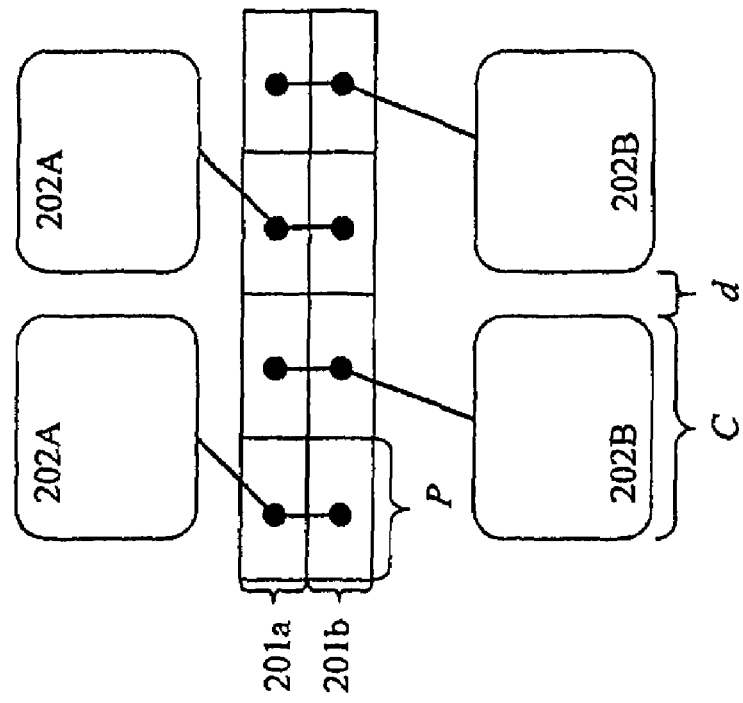
FIG. 2B is a representation of a prior art readout circuit incorporating a pixel array and a row of analog signal readout circuits and respective analog-to-digital converters at both the top and bottom edges of the pixel array.
Figure 2A:
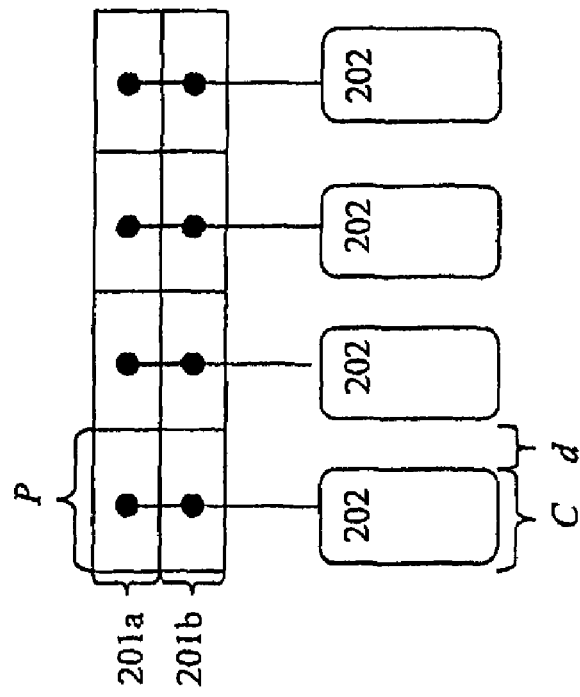
FIG. 2A is a representation of a prior art readout circuit incorporating a pixel array and a single row of analog signal readout circuits and respective analog-to-digital converters.

FIGS. 2A and 2B show simplified depictions of two rows of pixels in a pixel array (the rows are denoted by numerals 201a and 201b) and their associated processing elements 202. Each processing element 202 may contain a sample and hold circuit, a differential amplifier, a gain amplifier, and an analog-to-digital converter, though, as noted, the analog-to-digital converter occupies the most die area and defines the width of the processing element 202. FIG. 2A is a representation of a pixel array using a single row of processing elements 202. As shown in the figure, each processing element 202 has a physical width C, which is typically the width of the analog-to-digital converter, and no two analog-to-digital converters can be closer than the distance indicated by d due to the capacitance issues described above.

Thus, for circuits in which the analog-to-digital converters of processing elements 202 are laid out in a single slice (a slice being a linear array of processing elements, such as processing elements 202), the width of the analog-to-digital converters is a limiting factor in the efficient use of die space. That is, because each column of pixels is connected to a processing element 202, reductions in the width of columns of pixels might not allow more dense pixel arrays unless the analog-to-digital converter width is also made narrower. In such an arrangement, with only a single slice of processing elements 202, the widths of the columns of pixels and processing elements 202 are related as follows:

$$P \geq (C+d) \qquad (1)$$

where P is the minimum width of each column of pixels, C is the width of each analog-to-digital converter (or processing element 202, if the analog-to-digital converter is smaller than the overall processing element 202 or is not located within the processing element 202), and d is the distance required between adjacent processing elements (due to internal capacitance). As pixel sizes decrease, P is lowered, and thus C must also be reduced (as d is a fixed value). For this reason, analog-to-digital converters are often made in shapes that are extremely narrow, which results in long, rectangular analog-to-digital converters with large perimeters, a problem for overall component density and layout. Also, because components must be a certain distance from the edge of an analog-to-digital converter, an increased perimeter results in more surrounding space that may not used by other components. Alternatively, analog-to-digital converters may be placed outside the area directly below the columns of pixels (the "column area"), however other processing elements located in the column area may still act as minimum size constraints.

FIG. 2B is a representation of an pixel array using two slices of processing elements 202A, 202B having associated analog-to-digital converters. Processing elements 202A, 202B are located in slices at the top and bottom of the pixel array, respectively. The columns alternate between being readout by a processing element 202A at the top of the pixel array and an processing element 202B at the bottom of the pixel array. As shown in the figure, two columns of pixels may fit within the width of each processing element 202A, 202B, defined by the width of the analog-to-digital converter. Each analog-to-digital converter has a width C, and no two analog-to-digital converters can be closer than the distance indicated by d.

As shown in FIG. 2B, if the processing elements 202 are laid out in two slices, one at the top of the pixel array and one at the bottom, then each processing element 202 may take up as much as two columns of width. Equation 1 then becomes:

$$P \geq \frac{(C+d)}{2} \qquad (2)$$

Thus, even as each pixel becomes smaller, reducing the width P of each pixel column, the width C of the analog-to-digital converter of each processing element 202 (or the widths of other components, if the analog-to-digital converter is located outside the column space as discussed above) remains a limiting factor on the density of the pixels themselves.

Figure 3A:
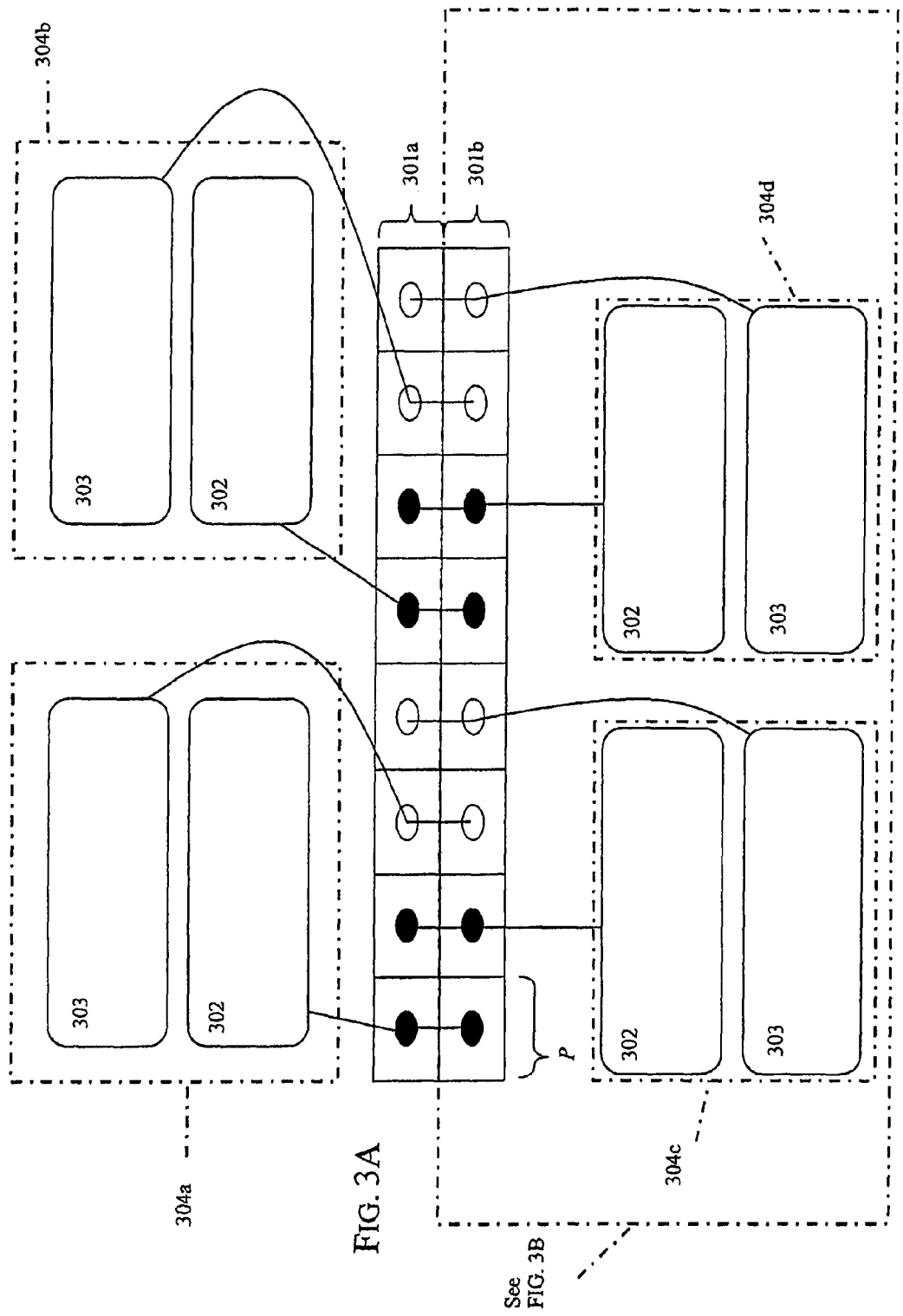
FIG. 3A is a representation of an example of a readout circuit incorporating a pixel array and processing elements according to an embodiment described herein.
Figure 3B:
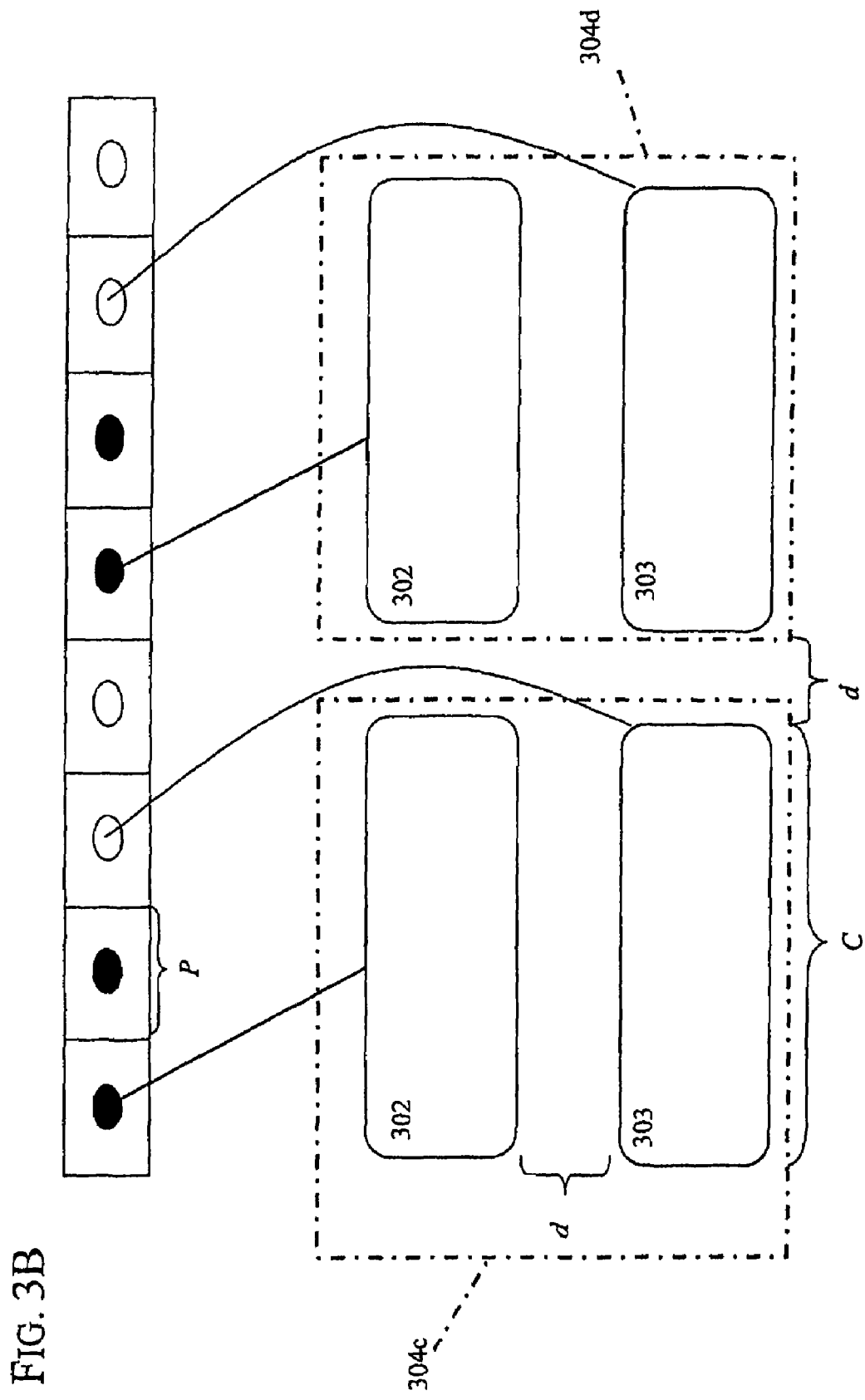
FIG. 3B is a detail view of FIG. 3A, showing a simplified view of the analog signal readout circuits and respective processing elements in that representation.
Figure 3C:
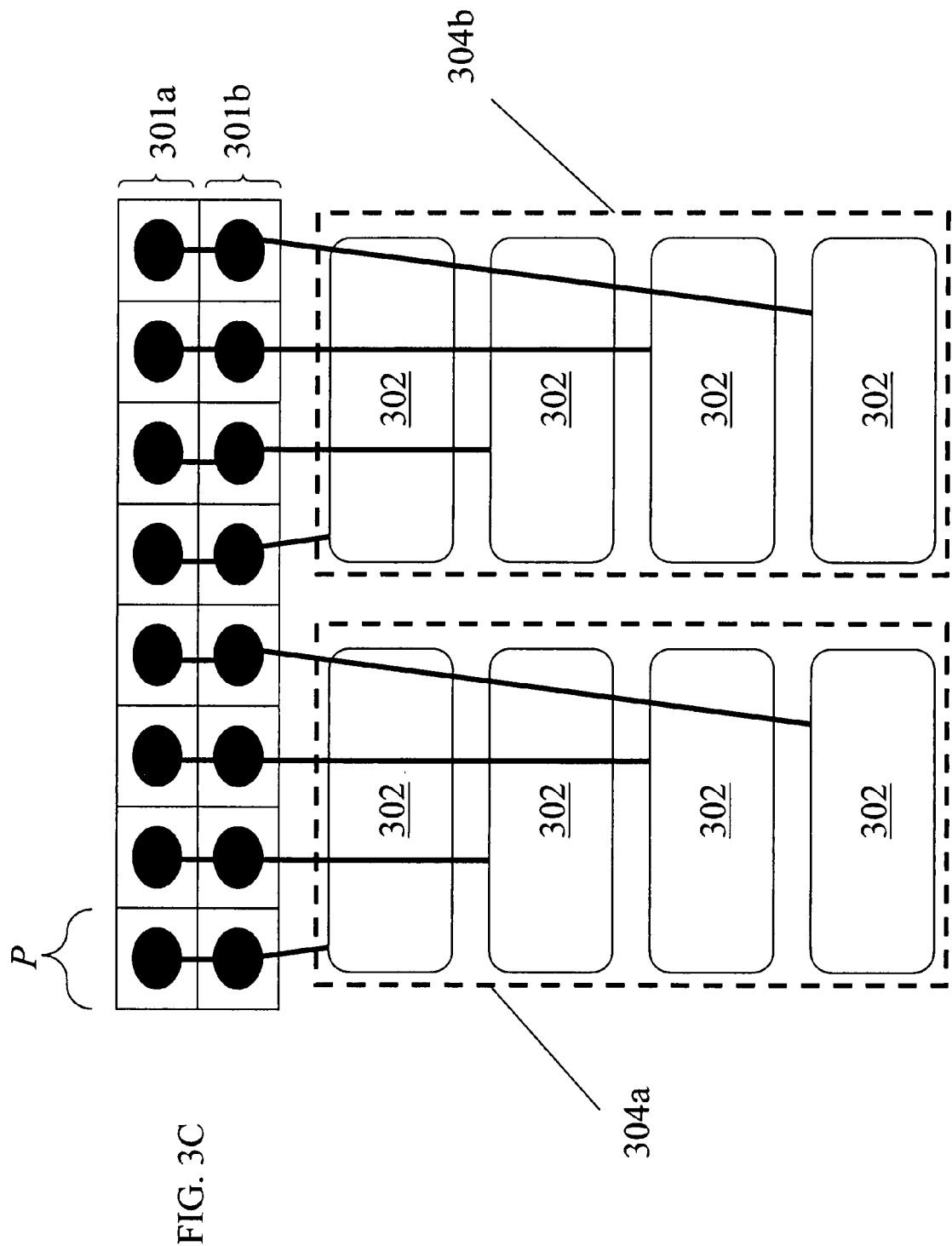
FIG. 3C is a representation of an example of a readout circuit incorporating a pixel array and processing elements according to an embodiment described herein.

FIGS. 3A, 3B, and 3C are block diagrams of an embodiment of the invention. In FIGS. 3A and 3B, two rows of pixels (denoted by numerals 301a and 301b) are illustrated with associated processing elements 302 and 303. In this embodiment, processing elements 302 are aligned in multiple slices at the top and bottom of the pixel array. Processing elements 302 contain circuitry for reading out, processing, and digitizing analog signals from the pixel array. Processing elements 302 and 303 may contain the elements described in the discussion of FIGS. 1, 2A, and 2B, such as sample and hold circuitry, differential amplifiers for subtracting signals, amplifiers to increase the gain of the analog signals, analog-to-digital converters for digitizing the analog signal, and other components for signal processing.

This circuit of FIG. 3A arranges pairs of processing elements 302, 303 into processing columns 304a, 304b, 304c, and 304d. Each pair includes processing element 302 and processing element 303. Processing elements 302 and 303 each include an analog-to-digital converter. The processing elements 302 are located in a first slice, adjacent the pixel array. The processing elements 303 are located in a second slice, adjacent the first slice. Each associated pair of processing elements 302 and 303 are depicted as aligned in columns (with respect to their left and right edges) for illustration purposes only. Various embodiments of the invention may have the processing elements 302 and 303 that are so aligned or not, depending on the particular application or fabrication needs.

FIG. 3B shows a detail view of the same embodiment depicted in FIG. 3A. Because the processing elements 302 are aligned in processing columns 304 above and below the pixel array, each processing column 304 (and its associated buffer area d separating it from adjacent processing columns 304) spans four pixels. Each processing column 304 has a width C (the width of the analog-to-digital converter) and a buffer area d, the combined width of C and d being equal to four pixel-widths (P).

Thus, the width of each pixel, P, may be reduced to one-fourth of (C+d) without wasting space between columns of pixels. As described above, and unlike the arrangement shown in FIGS. 2A and 2B, there may be up to four pixel columns per processing column 304 in the embodiment of FIGS. 3A and 3B. This modification allows the new minimum pixel-width to be:

$$P \geq \frac{(C+d)}{4} \tag{3}$$

This represents a two-fold increase in the ratio of pixel-width to processing element width over the embodiment represented by FIG. 2B. Thus, without any reduction in the size of each processing element or other readout circuitry, the embodiment of FIGS. 3A and 3B allows a halving of pixel size.

Due to other design constraints, such as the position of the pixels on the underlying device or the proximity of other components, it may be necessary to place all processing elements on a single side of the pixel columns (also arranged in pixel rows 301a and 301b, as described above with reference to FIG. 3A). As shown in FIG. 3C, the processing elements 302 may be arranged in processing columns 304a and 304b on only one side of the pixel columns. This embodiment requires approximately the same amount of space on a die as the embodiment of FIGS. 3A and 3B but provides flexibility regarding the position of the processing elements 302. Though the routing lines between the pixel rows 301a, 301b and the processing elements 302 are shown as overlapping the processing elements for illustrative purposes, in reality they may also be routed around the processing elements 302.

Figures 4A, 4B:
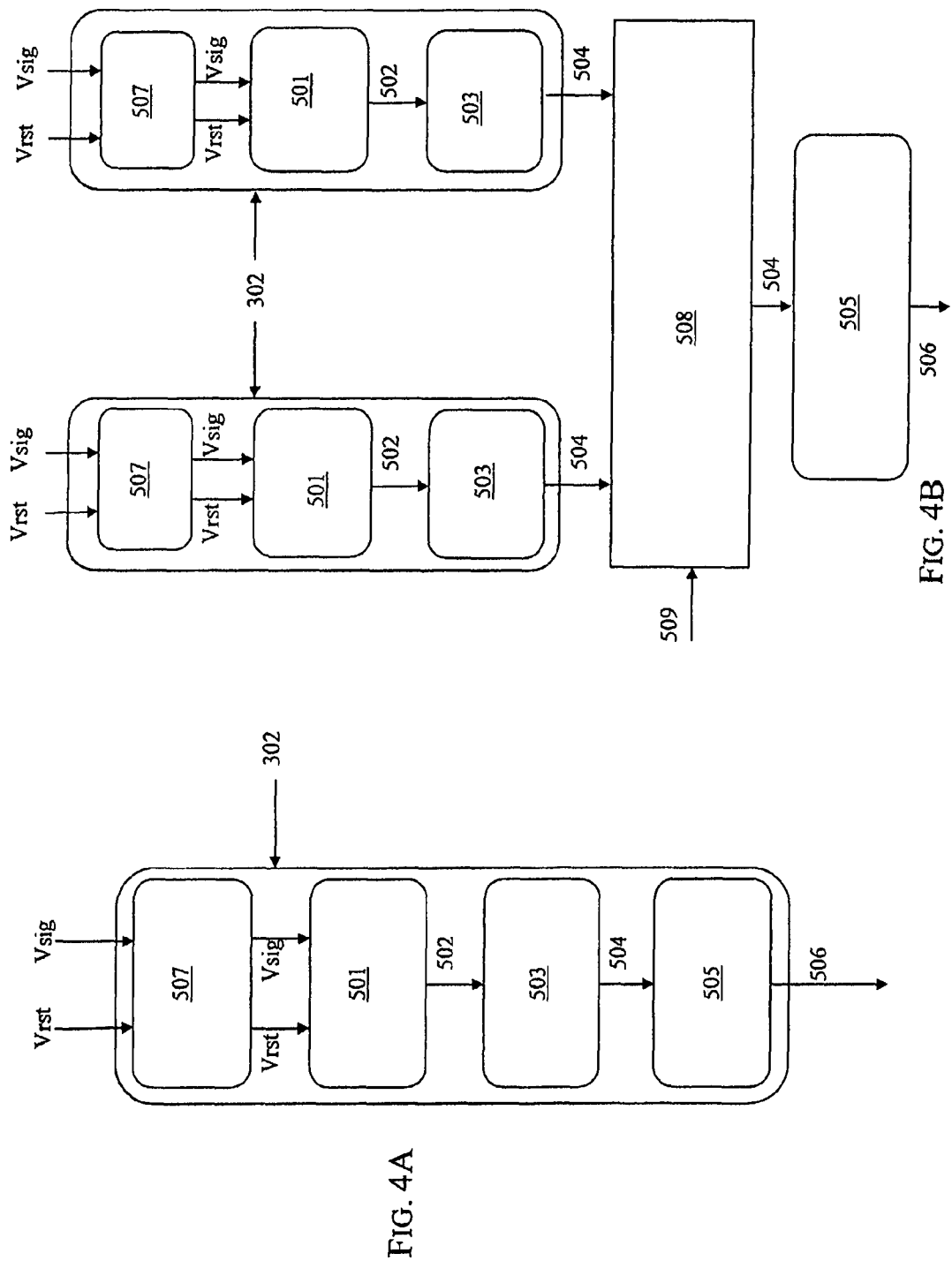
FIG. 4A is a detail view of a processing element according to an embodiment described herein.
FIG. 4B is a detail view of a processing element according to an embodiment described herein.

FIGS. 4A and 4B show more detailed views of the processing elements 302 in two embodiments. In FIG. 4A, the reset and photodiode signals, Vrst and Vsig respectively, are stored in the sample and hold circuit 507, which samples analog signals Vrst and Vsig and supplies them to the differential amplifier 501. The differential amplifier 501 then subtracts Vrst and Vsig to produce differential signal 502. The differential signal 502 is supplied to an amplifier 503, which may provide a voltage gain to the signal, producing amplified signal 504. Amplified signal 504 is then supplied to analog-to-digital converter 505, which converts the analog amplified signal 504 into digitized signal 506. As shown in FIG. 4A, in this embodiment each processing element 302 contains a sample and hold circuit 507, differential amplifier 501, a gain amplifier 503, and an analog-to-digital converter 505. The circuit shown in FIG. 3A is used for each column of pixels.

FIG. 4B shows another embodiment in which fewer components are needed overall. FIG. 4B shows the analog reset and photodiode signals Vrst and Vsig from two pixels on different column lines in a selected pixel row 301. Each pair of analog signals Vrst and Vsig is received by a processing element 302, and is respectively supplied to a sample and hold circuit 507. After the Vrst and Vsig signals for different columns are sampled by respective sample and hold circuits 507, they are respectively subtracted by differential amplifiers 501 and may be amplified by amplifier 503.

In the embodiment of FIG. 4B, unlike that of FIG. 4A, the processing elements 302 do not contain analog-to-digital converters. Instead, the amplified signals 504 are fed to a switch 508, which may be a multiplexer or similar component. Switch 508 selectively passes one amplified signal 504 to a shared analog-to-digital converter 505 based on control signal 509. Control signal 509 may be supplied by a modified timing and control circuit 150 (FIG. 1) or other control circuitry. Analog-to-digital converter 505 digitizes each amplified signal 504 in turn, passing the digitized signal 506 on to other processing circuitry, such as an image processor circuit 180, shown in FIG. 1. In other embodiments, a single analog-to-digital converter 505 may be shared among any number of processing elements 302. The control signal 509 may be operated to feed signals to the shared analog-to-digital converter 505 from each associated processing element 302 in turn. Such an arrangement would be useful when the number of analog-to-digital converters must be limited, as it preserves some of the advantages of column parallel design. Though this reduces the number of circuits needed overall, it may decrease the frame rate (a measure of the speed in converting the entire image into digital form) as each analog-to-digital converter 505 must process several signals from different columns in series, potentially diminishing the advantages gained in systems that include one analog-to-digital converter 505 per pixel column. Nonetheless, if the analog-to-digital converters operate faster than other elements in the overall circuit, each shared analog-to-digital converter 505 may serve as a digitizing circuit for multiple processing elements 302 without any loss in performance.

Figure 5A:
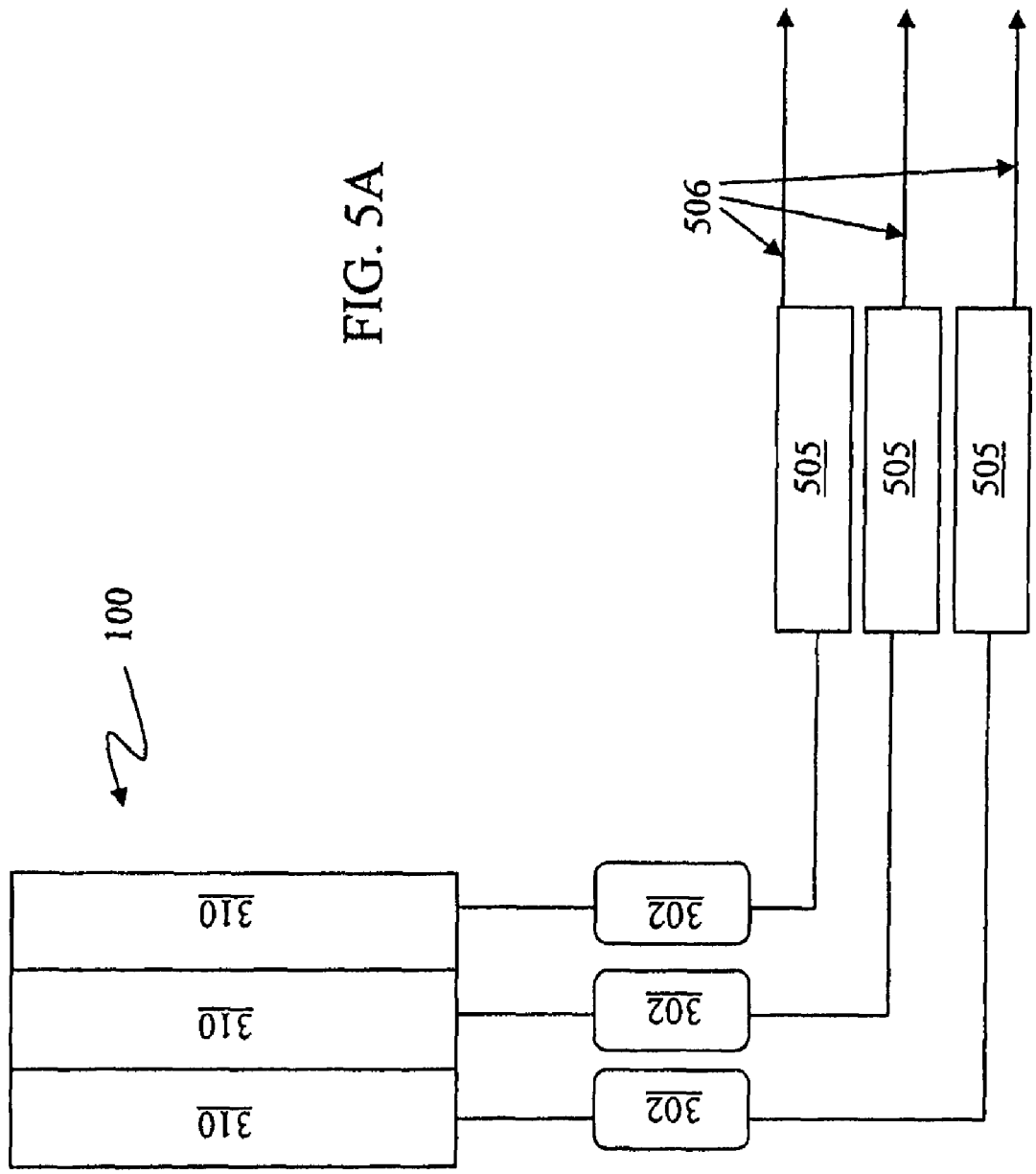
FIG. 5A is a representation of an example of a readout circuit incorporating a pixel array, processing elements, and analog-to-digital converters located outside the column area according to an embodiment described herein.
Figure 5B:
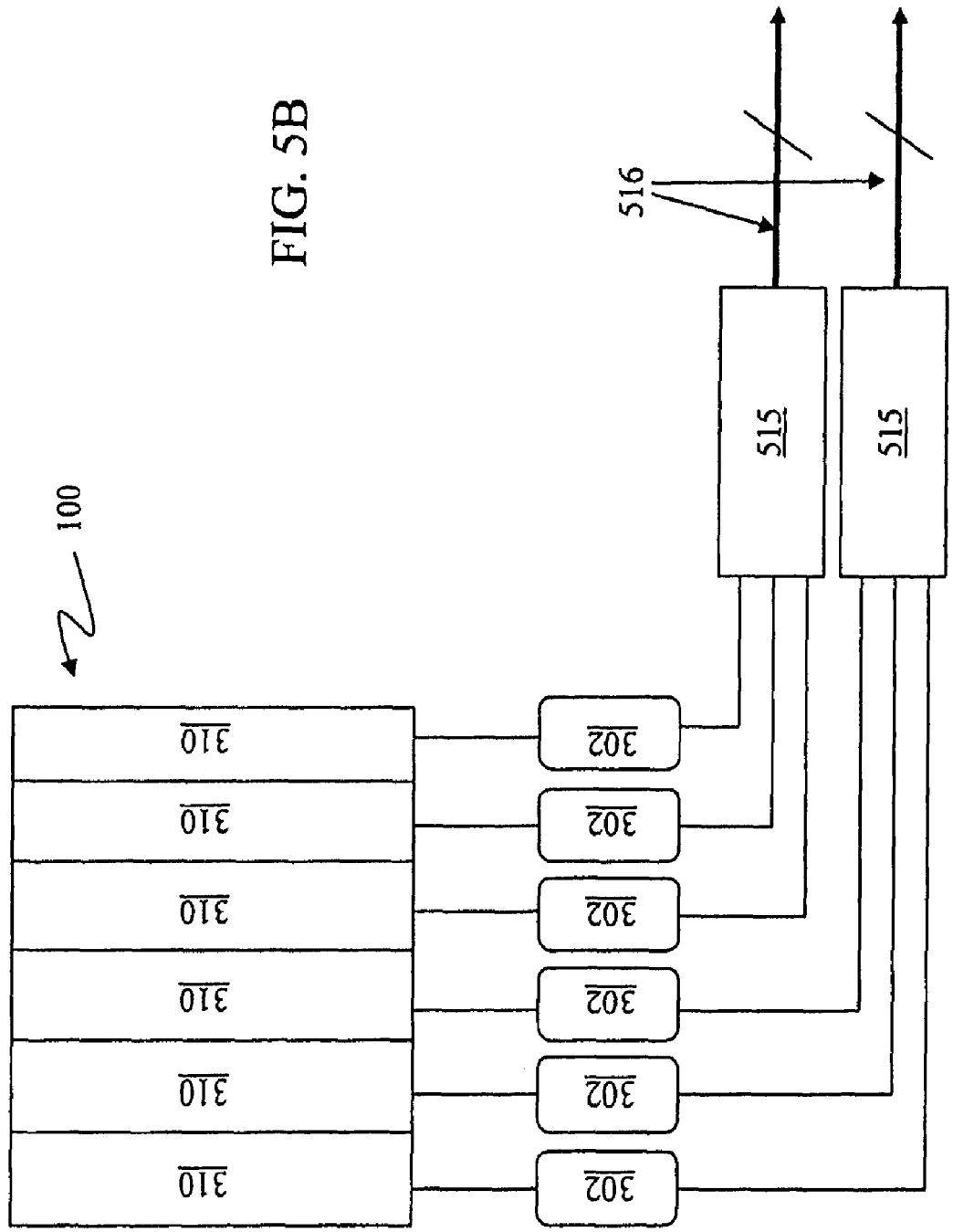
FIG. 5B is a representation of an example of a readout circuit incorporating a pixel array, processing elements, and bussed analog-to-digital converters located outside the column area according to an embodiment described herein.
Figure 5C:
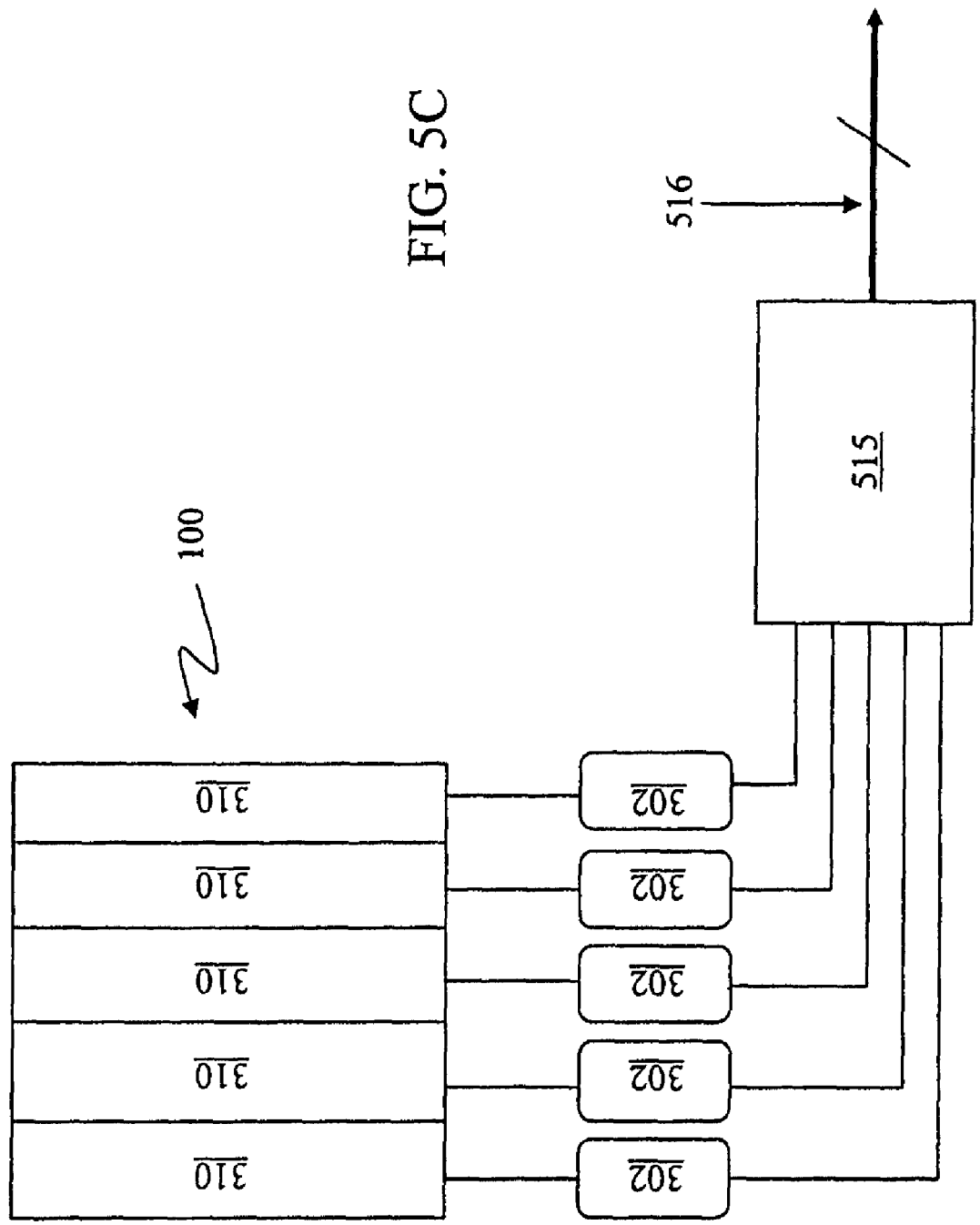
FIG. 5C is a representation of an example of a readout circuit incorporating a pixel array, processing elements, and a single bussed analog-to-digital converter located outside the column area according to an embodiment described herein.

The embodiments of FIGS. 3A, 3B, and 4A have analog-to-digital converters, e.g. 505, within processing elements, e.g. 302, 303, arranged below the pixel columns in the "column area." The analog-to-digital converters, e.g. 505, may alternatively be located outside the processing elements, e.g. 302, 303, as in the embodiment of 4B. This allows processing elements, e.g. 302, 303, to shrink at a rate similar to the pixel column width P (FIGS. 3A, 3B) without an analog-to-digital converter, e.g. 505, as a minimum size constraint. FIGS. 5A, 5B, and 5C show three embodiments with analog-to-digital converters, e.g. 505, 515, outside the column area.

In FIG. 5A, three pixel columns 310, part of a pixel array 100, are each connected to a processing element 302, such as the processing element 302 in FIG. 4B. The pixel and reset signals from each pixel column 310 are passed to a respective processing element 302, as described above with reference to FIGS. 4A, 4B. The signal output from each processing element 302 is then passed to an analog-to-digital converter 505 that is located outside the area under the column area. Thus, the pixel columns 310 are limited by the minimum width of the processing elements 302 but not the less scaleable analog-to-digital converters 505. The digitized signals 506 are passed on other circuitry as described above.

The embodiments of FIGS. 5B and 5C operate in the same manner as that of the embodiment of FIG. 5A, however bussed analog-to-digital converters 515 are used, each converting signals from multiple processing elements 302. The bussed analog-to-digital converters 515, also located outside the column area, may accept the signals in sequence or in parallel, each passing the set of digitized signals as a digitized bus signal 516 for further processing as described above. The embodiment of FIG. 5C is identical to that of FIG. 5B, but only a single bussed analog-to-digital converter 515 is used.

Though the embodiment shown in FIGS. 3A and 3B used processing columns 304 that contained two processing elements 302 and 303 each, other embodiments may contain any number of processing elements in each processing column. One skilled in the art will observe that the number of processing elements 302 in each processing column 304 is limited only by the space available surrounding the pixel array and by limitations inherent in the fabrication process used. As the number of processing elements within each processing column increases, the minimum width for each pixel (and thus, the minimum width of each column of pixels) decreases proportionally. The minimum width for a pixel for an imager with some number n rows of processing elements on each of two sides of the pixel array is given by:

$$P \geq \frac{(C+d)}{2 \cdot n} \quad (4)$$

Figure 6:
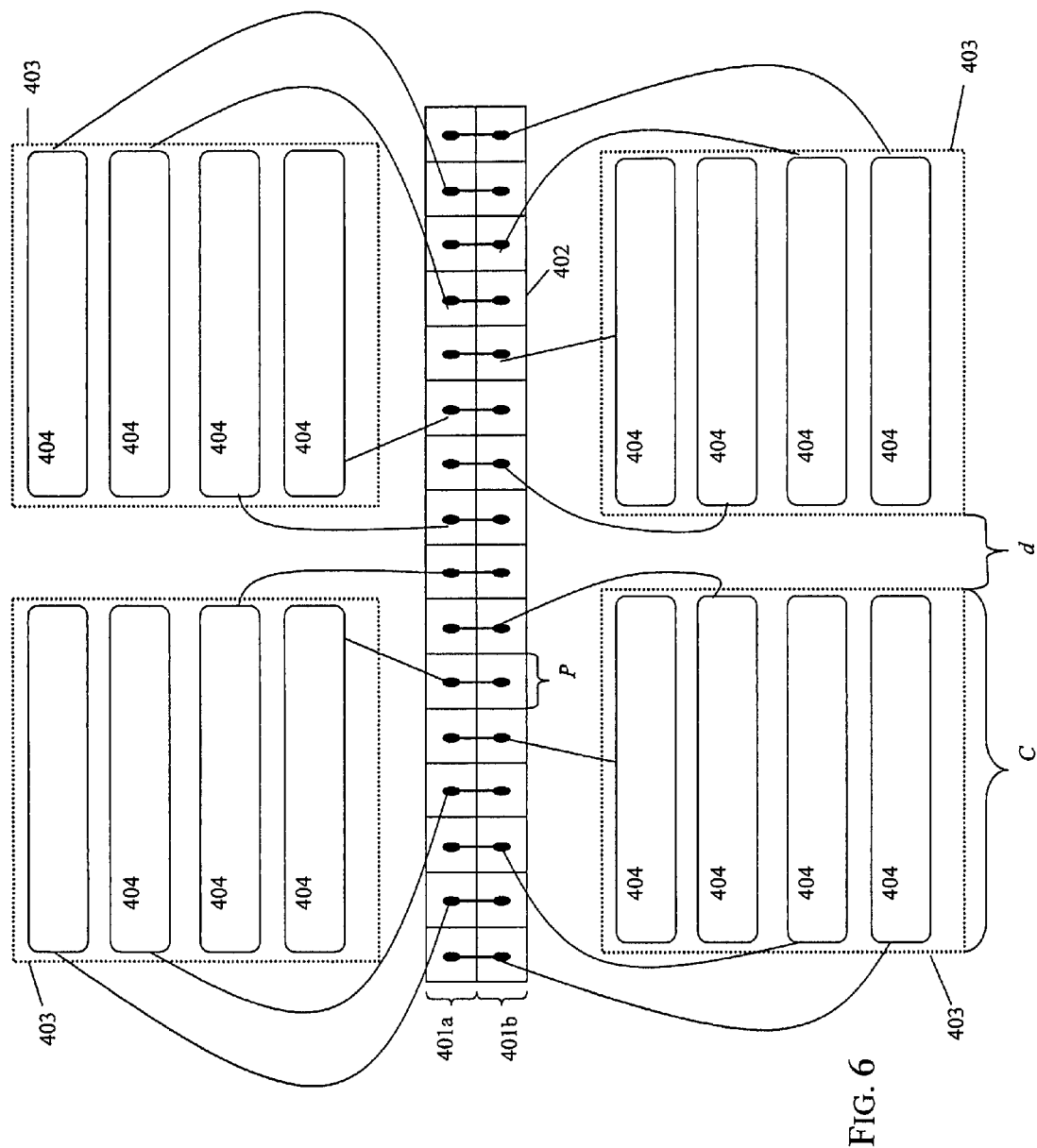
FIG. 6 is a representation of an example readout circuit incorporating a pixel array and processing element columns according to an embodiment described herein.

FIG. 6 shows a portion of an embodiment having n slices of processing elements 404 on the top and bottom of the pixel array (in the particular embodiment of FIG. 6, n=4). Each pixel row (two rows 401a and 401b are shown) contains 2 n pixels (the circuit represented in FIG. 6 includes 16 pixels in each pixel row). The circuit represented in FIG. 6 includes an processing element 404 for each pixel column 402 in the pixel array. Each processing element 404 may include a sample and hold circuit, differential amplifier, amplifier, and analog-to-digital converter. Thus, during the readout sequence each pixel in a selected pixel row 401 may be read out at once. Each pixel column 402 is associated with a particular processing element 404 within a processing column 403. As shown in the figure, the combined width of the 2 n pixel-columns 402, each having a width P, is equal to the combined width C of a single processing column 403 and the buffer distance d required between processing columns. Using this arrangement, the number n of slices of processing elements 404 may be selected to allow any arbitrary width C for each single processing column 403. This allows, for example, the use of processing elements that are square in shape, which improves matching between components. Additionally, a square shaped component has a minimum perimeter (relative to the area enclosed), which reduces the percentage of unusable area between the components.

The systems shown in FIGS. 3 and 6 have several advantages over the design of FIGS. 2A and 2B. First, embodiments of the invention may include larger processing elements, and thus larger components such as analog-to-digital converters, allowing for much greater accuracy during the fabrication process. This allows much greater matching between various components. For example, a system with larger analog-to-digital converters will have better matching between each converter, which ensures that pixel signals in each column are handled identically. Likewise, the components internal to the converters will be better matched, enhancing the functionality of the converters. For example, when capacitors within an analog-to-digital converter are more closely matched (that is, their capacitance is better calibrated to their intended purposes), the analog-to-digital converter performs better and each pixel value is converted to a more accurate digital representation.

A second advantage is that previous techniques required processing elements to be rectangular with large height-to-width ratios (where width is the dimension parallel to the pixel rows) in order to narrow each processing element as much as possible (and thus bring their associated pixel columns closer together). Embodiments of the present invention allow for wider processing elements (and thus wider internal component, such as analog-to-digital converters), which allows the components to take shapes that are closer to squares, resulting in much smaller perimeters. Because many components, including analog-to-digital converters, must be a certain distance from other components, reducing the perimeter of each component simplifies the design and layout of the surrounding circuit.

The processing circuits 302, 303, 404 are described herein as comprising an analog-to-digital converter and associated analog processing circuits such as sample and hold circuits, differential amplifiers, and amplifiers. However, they need only include, as a minimum, the analog-to-digital converter. Other analog circuit elements may be provided outside the processing circuits 302, 303, 304. In addition, although embodiments have been described as including a differential amplifier for subtracting, the Vrst and Vsig, signals, these signals can alternatively be supplied directly to a differential analog-to-digital converter in which case the differential amplifier and additional amplifier can be omitted.

Figure 7A:
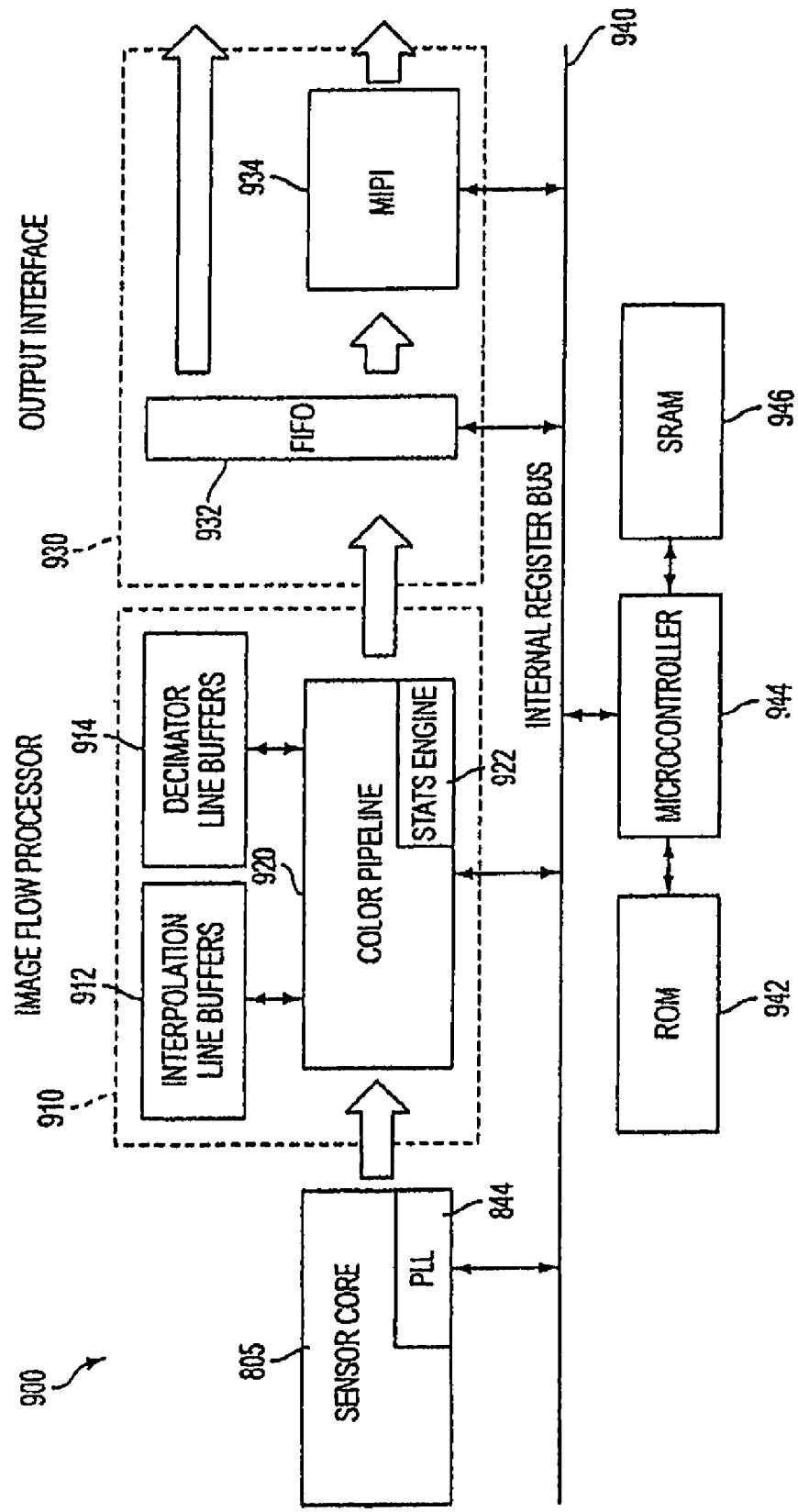
FIG. 7A is a block diagram of system-on-a-chip imaging device constructed in accordance with an embodiment.

FIG. 7A illustrates a block diagram of an exemplary system-on-a-chip (SOC) imaging device 900 constructed in accordance with an embodiment. The imaging device 900 comprises a sensor core 805 having a pixel array that communicates with an image flow processor 910 that is also connected to an output interface 930. A phase locked loop (PLL) 844 is used as a clock for the sensor core 805. The image flow processor 910, which is responsible for image and color processing, includes interpolation line buffers 912, decimator line buffers 914, and a color pipeline 920. The color pipeline 920 includes, among other things, a statistics engine 922. The output interface 930 includes an output first-in-first-out (FIFO) parallel output 932 and a serial Mobile Industry Processing Interface (MIPI) output 934. The user can select either a serial output or a parallel output by setting registers within the chip. An internal register bus 940 connects read only memory (ROM) 942, a microcontroller 944 and a static random access memory (SRAM) 946 to the sensor core 805, image flow processor 910 and the output interface 930.

Figure 7B:
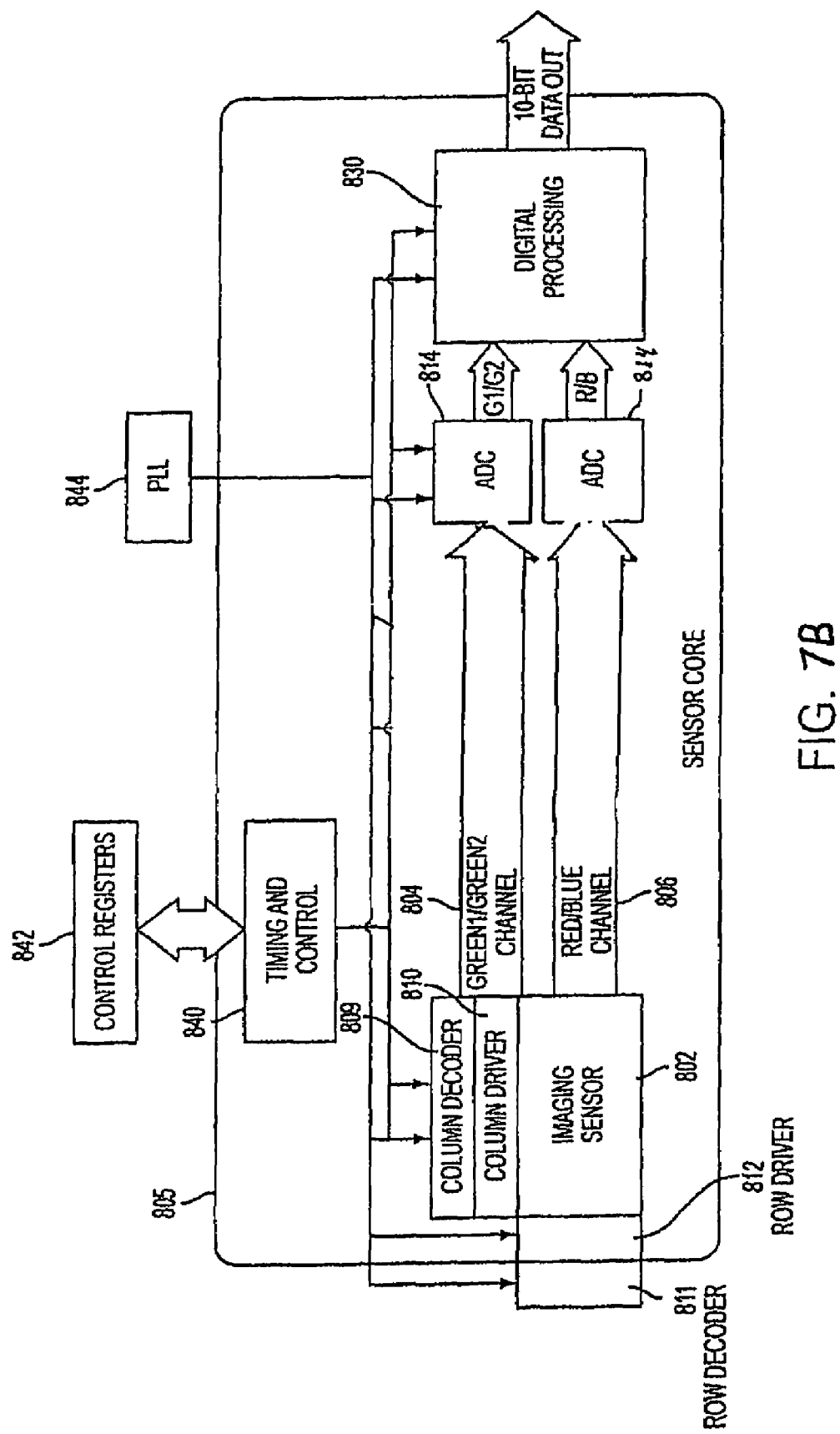
FIG. 7B illustrates an example of a sensor core used in the FIG. 7A device.

FIG. 7B illustrates a sensor core 805 used in the FIG. 7A imaging device 900. The sensor core 805 includes an imaging sensor 802, which is connected to a set of analog-to-digital converters 814 by a greenred/greenblue channel 804 and a red/blue channel 806. Although only two channels 804, 806 are illustrated, there are effectively two green channels, one red channel, and one blue channel, for a total of four channels. The greenred (i.e., Green1) and greenblue (i.e., Green2) signals are readout at different times (using channel 804) and the red and blue signals are readout at different times (using channel 806). The analog-to-digital converters 814 processes greenred/greenblue signals G1/G2 or red/blue signals R/B and converts the signals from analog to digital form. The outputs of the analog-to-digital converter 814 are sent to a digital processor 830. The analog-to-digital converter 814 and associated analog processing circuits, e.g. sample and hold circuit, differential amplifier, analog amplifier, may be constructed as described in the embodiments discussed above.

Connected to, or as part of, the imaging sensor 802 are row and column decoders 811, 809 and row and column driver circuitry 812, 810 that are controlled by a timing and control circuit 840. The timing and control circuit 840 uses control registers 842 to determine how the imaging sensor 802 and other components are controlled, for example, controlling the mode of operation of the imaging sensor 802 (e.g., global reset mode or electronic rolling shutter). As set forth above, the PLL 844 serves as a clock for the components in the core 805.

The imaging sensor 802 comprises a plurality of pixel circuits arranged in a predetermined number of columns and rows. In operation, the pixel circuits of each row in imaging sensor 802 are all turned on at the same time by a row select line and other control lines and the pixel circuits of each column are selectively output onto column output lines by a column select line. A plurality of row and column lines are provided for the entire imaging sensor 802. The row lines are selectively activated by row driver circuitry 812 in response to the row address decoder 811 and the column select lines are selectively activated by a column driver 810 in response to the column address decoder 809. Thus, a row and column address is provided for each pixel circuit. The timing and control circuit 840 controls the address decoders 811, 809 for selecting the appropriate row and column lines for pixel readout, and the row and column driver circuitry 812, 810, which apply driving voltage to the drive transistors of the selected row and column lines.

Each column is connected to a processing circuit 814 containing sampling capacitors and switches that sample and hold a pixel reset signal Vrst and a pixel image signal Vsig. Because the core 805 uses greenred/greenblue channel 804 and a separate red/blue channel 806, processing circuits 814 will have the capacity to store Vrst and Vsig signals for greenred, greenblue, red, and blue pixel signals. A differential signal (Vrst-Vsig) is produced by differential amplifiers contained in the processing circuits 814 for each pixel. Thus, the signals G1/G2 and R/B are differential signals that are then digitized by a respective analog-to-digital converter within processing circuit 814. The processing circuits 814 supply digitized G1/G2, R/B pixel signals to the digital processor 830, which forms a digital image output (e.g., a 10-bit digital output). The digital processor 830 performs pixel processing operations. The output is sent to the image flow processor 910 (FIG. 7A).

Although the sensor core 805 has been described with reference to use with a CMOS imaging sensor, this is merely one example sensor core that may be used. Embodiments of the invention may also be used with other sensor cores having a different readout architecture. While the imaging device 900 (FIG. 7A) has been shown as a system-on-a-chip, it should be appreciated that the embodiments are not so limited. Other imaging devices, such as, for example, a stand-alone sensor core 805 coupled to a separate signal processing chip could be used in accordance with the embodiments.

Figure 8:
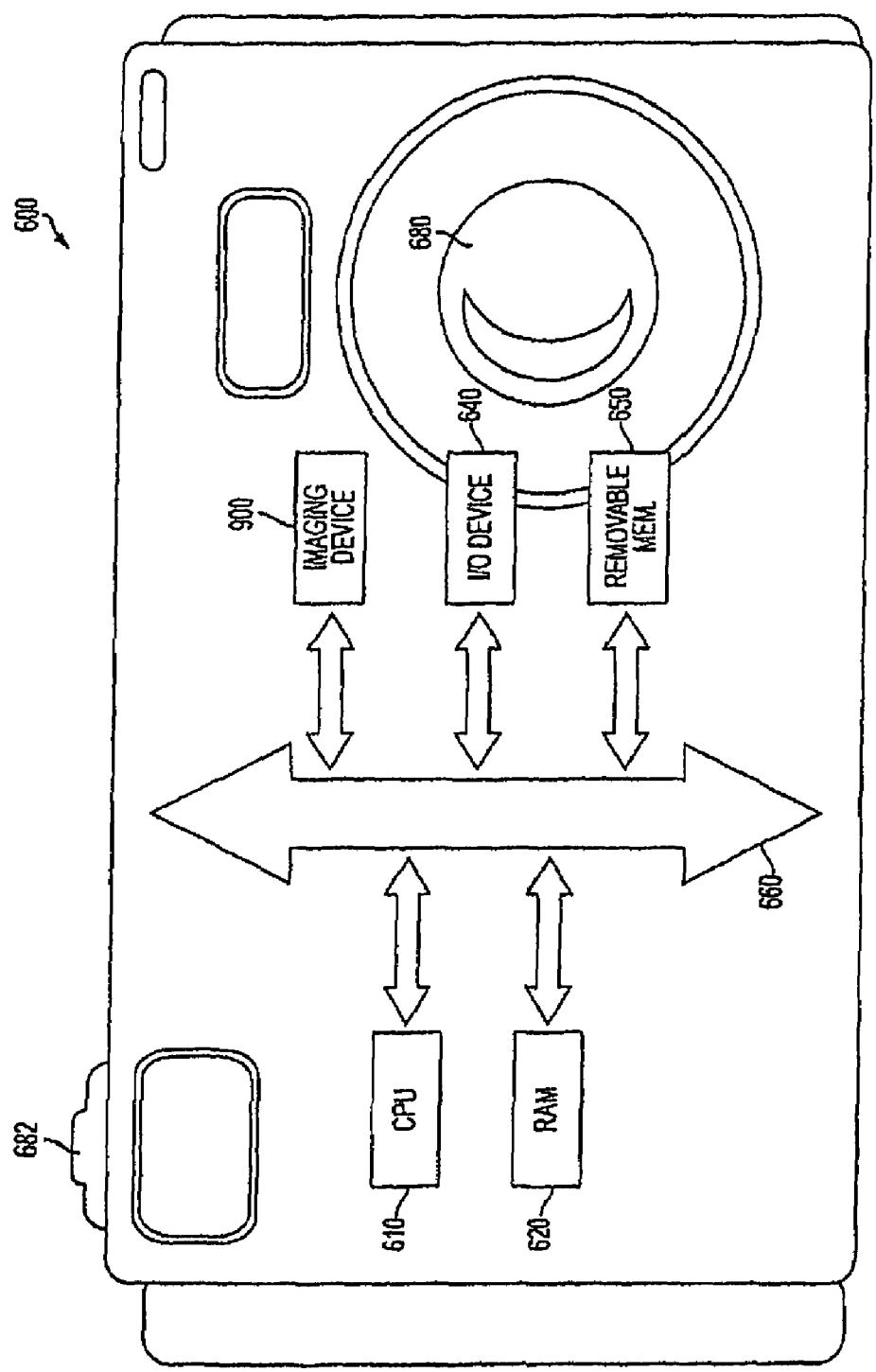
FIG. 8 shows an embodiment of a system, e.g. a camera system, incorporating at least one imaging device employing an embodiment described herein.

FIG. 8 shows a typical system 600, such as, for example, a camera system. The system 600 is an example of a system having digital circuits that could include imaging devices 900. Without being limiting, such a system could include a computer system, scanner, machine vision, vehicle navigation system, video phone, surveillance system, auto focus system, star tracker system, motion detection system, image stabilization system, and other systems employing an imaging device 900. Additionally, such a system could include the illustrated camera system, including a digital video camera, a digital still camera, or a digital single-lens reflex camera.

System 600, for example, a camera system, includes a lens 680 for focusing an image on the pixel array of the imaging device 900 when a shutter release button 682 is pressed. System 600 generally comprises a central processing unit (CPU) 610, such as a microprocessor that controls camera functions and image flow, and communicates with an input/output (I/O) device 640 over a bus 660. The imaging device 900 also communicates with the CPU 610 over the bus 660. The system 600 also includes random access memory (RAM) 620, and can include removable memory 650, such as flash memory, which also communicates with the CPU 610 over the bus 660. The imaging device 900 may be combined with the CPU 610, with or without memory storage on a single integrated circuit, such as, for example, a system-on-a-chip, or on a different chip than the CPU 610.

The above description and drawings are only to be considered illustrative of example embodiments which achieve the features and advantages of the invention. Many modifications, even substitutions of materials, can be made. Accordingly, the above description and accompanying drawings are only illustrative of the example embodiments.

What is claimed as new and desired to be protected by Letters Patent of the United States is:

1. An imager comprising:
   an array of pixels arranged in a plurality of rows and a plurality of columns,
   a first array of processing circuits adjacent a first edge of the array of pixels, each of said processing circuits being coupled to receive pixel signals from a column of said array,
   wherein the first array of processing circuits comprises n rows of processing circuits, where n>1, and
   wherein each row of processing circuits in the first array of processing circuits comprises processing circuits satisfying:

$$P \geq \frac{(C+d)}{n},$$

wherein P represents the average width of all pixels in the pixel array, C represents the average width of the processing circuits in the row, d represents the average distance between processing circuits in the row, and n represents the number of rows in the first array of processing circuits.

2. An imager comprising:
   an array of pixels arranged in a plurality of rows and a plurality of columns,
   a first array of processing circuits adjacent a first edge of the array of pixels, each of said processing circuits being coupled to receive pixel signals from a column of said array, wherein the first array of processing circuits comprises n rows of processing circuits, where n>1, and wherein the imager further comprises a second array of processing circuits, wherein the second array of processing circuits comprises m rows of processing circuits, where m>1, each of said processing circuits in said m rows comprising an analog-to-digital converter, each being coupled to receive pixel signals from a column of said array, and each row of processing circuits in the first array and second array comprising processing circuits satisfying:

$$P \geq \frac{(C+d)}{m+n}$$

wherein P represents the average width of all pixels in the pixel array, C represents the average width of all analog-converters in the first array and second array, d represents the average distance between all adjacent processing circuits in all rows.

* * * * *